(12) United States Patent
Saito (10) Patent No.: US 9,004,763 B2
(45) Date of Patent: Apr. 14, 2015

(54) LINEAR MOTION GUIDE UNIT WITH BURIED PLUG

(71) Applicant: Nippon Thompson Co., Ltd., Tokyo (JP)

(72) Inventor: Masahide Saito, Tokyo (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 14/140,621

(22) Filed: Dec. 26, 2013

(65) Prior Publication Data
US 2014/0177985 A1    Jun. 26, 2014

(30) Foreign Application Priority Data
Dec. 26, 2012    (JP) ................................. 2012-282812

(51) Int. Cl.
*F16C 29/06* (2006.01)
*F16C 29/08* (2006.01)
*F16C 29/00* (2006.01)
*F16B 37/14* (2006.01)

(52) U.S. Cl.
CPC ........... F16C 29/082 (2013.01); *F16C 29/0633* (2013.01); *F16C 29/004* (2013.01); *F16C 29/065* (2013.01); *F16B 37/14* (2013.01)

(58) Field of Classification Search
CPC .. F16C 29/082; F16C 29/0633; F16C 29/004; F16C 29/065
USPC ......................................... 384/43–45, 55, 59
See application file for complete search history.

(56) References Cited

U.S. PATENT DOCUMENTS

| | | | | |
|---|---|---|---|---|
| 5,622,433 A | * | 4/1997 | Suzuki et al. ................... | 384/45 |
| 7,883,269 B2 | * | 2/2011 | Iida et al. ......................... | 384/15 |
| 8,328,422 B2 | * | 12/2012 | Lin et al. ......................... | 384/43 |

FOREIGN PATENT DOCUMENTS

| | | | | |
|---|---|---|---|---|
| JP | 2002-048138 A | | 2/2002 | |
| JP | 2002227838 A | * | 8/2002 | .............. F16C 29/06 |
| JP | 2007-192282 A | | 8/2007 | |

\* cited by examiner

*Primary Examiner* — Thomas R. Hannon
(74) *Attorney, Agent, or Firm* — Browdy and Neimark, PLLC (57) ABSTRACT

A buried plug has interference which is made to exert a load or stress less in a widthwise direction of the guide rail than in a lengthwise direction of the guide rail, thereby protect raceways on the guide rail against any deformation such as bulge. The buried plug has a mating zone to press fit into a counterbore of a bolt hole and a leading zone to guide the mating zone into the counterbore. Let assuming a definition that a direction perpendicular to a lengthwise direction of the guide rail is referred to a direction opposed to the raceway surface or the widthwise direction of the guide rail, the interference exerting a force on the counterbore in the widthwise direction is determined less than the interference exerting the force on the counterbore in the lengthwise direction of the guide rail.

16 Claims, 10 Drawing Sheets

LINEAR MOTION GUIDE UNIT WITH BURIED PLUG

FIELD OF THE INVENTION

The present invention relates generally to a linear motion guide unit composed of a guide rail having bolt holes formed spaced at preselected intervals in a lengthwise direction on a top surface of the guide rail to fasten the guide rail to other members such as a machine bed, basement and so on, and a slider allowed to move relative to the guide rail. More particularly, the present invention relates to a linear motion guide unit in which the bolt hole in the guide rail is counterbored and a buried plug snugly fits into the counterbored bolt hole.

BACKGROUND OF THE INVENTION

A diversity of linearly reciprocating mechanisms and so on installed in recent years in semiconductor manufacturing equipment, precision machines, industrial robot, assembling machines and so on is designed compact or reduced in construction in favor of energy saving or high energy efficiency. Correspondingly, linear motion guide units built in relatively sliding parts used in the machinery as stated just earlier are also needed compact or downsized in construction while expected to carry heavy loads and make sure of smooth and accurate movement of the slider relative to the guide rail. With conventional linear motion guide units in which the guide rail has bolt holes used to fasten the guide rail to the machine bed and fastening bolts are screwed into the bolt holes to fasten the guide rail to the machine bed, a cap bolt has been fit pressed into a counterbored hole to prevent any foreign matter from creeping into a gap between the bolt hole and the top surface of the guide rail.

In a commonly-owned Japanese Laid-Open Patent Application No. 2002-48 138, recited as patent literature 1 later, there is disclosed a buried plug to close a bolt hole in a guide rail of a linear motion guide unit, in which the buried plug has a leading end having a height extending from a bottom of the guide rail across 1/5 the overall height of the guide rail. The buried plug, when placed in the bolt hole preparatory to press-in operation, may be held in proper attitude with stability by virtue of the leading end which has a peripheral circular surface smaller in diameter than the inside diameter of the bolt hole. This means that the buried plug at the leading end thereof is easily introduced into the bolt hole and kept in the bolt hole with a stable attitude. The buried plug while keeping the stable attitude is press fit or forced deep into the bolt hole at a mating zone. The mating zone has a plurality of relief grooves deeper than the interference for press fit. The power of the press fit is allowed to flee into the relief grooves so that the guide rail is protected against deformation such as bulging sidewise.

In a commonly-owned Japanese Laid-Open Patent Application No. 2007-192 282 there is disclosed a linear motion guide unit with rollers or balls, which is befitted for machines such as tool machines. The linear motion guide unit constructed as stated earlier has a buried plug which can fit easily and stably into a bolt hole. The buried plug is made of hard material including iron and stainless steel and rich in durability so as not to suffer to any damage caused by cutting chips. The buried plug is a ceiling plate which is made flush with the top surface of the guide rail so as not to cause damage to the end seal lips of the slider.

With the prior linear motion guide units in which the buried plug is press fit into a counterbored hole formed in the guide rail, as the guide rail is inevitably become less in thickness near the counterbored hole thereof, the guide rail, upon being press fit of the buried plug into the counterbored hole, bulges sidewise and particularly the races formed on both sides on the guide rail possibly suffer deformation or warp, which would cause obstacles to a smooth reciprocating movement of the slider along the guide rail. With the linear motion guide unit in which the slider moves on the guide rail by virtue of the rolling elements rolling through the races on the guide rail, thus, it remains a major challenge to keep the races on the both sides of the guide rail against the deformation to make sure of smooth sliding of the slider by virtue of the rolling elements interposed between the slider and the races on the guide rail.

With the prior linear motion guide unit constructed as stated earlier, the buried plug around the mating area thereof has a plurality of grooves to lessen an adverse impact which would be applied on the races at the time of press fit of the buried plug. Moreover, the prior buried plug recited earlier is made of aluminum alloy or brass, which is hard to give rise to falling away from the hole and collapse caused by the outside load, compared with the synthetic resin-made buried plug. Though the prior buried plug is contrived to restrain from the adverse impact on the races upon press fit of the buried plug into the counterbored hole in the guide rail, the buried plug has an interference extending around the full circumference of the counterbored hole. Namely, the load or stress caused by the interference with the bolt hole is allowed to free itself into the grooves around the mating zone and, in doing so, the buried plug is kept against excessively pushing the bolt hole away radially outwardly, so that the races on the guide rail is protected against outward bulge or deformation. Nevertheless, the prior buried plug constructed as stated earlier has the interference spreading uniformly over the full circumference of the bolt hole, so that the load or stress is exerted on the full circumference of the bolt hole, thereby probably negatively affecting any impact such as deformation on the race surfaces extending lengthwise of the guide rail. Near the bolt hole in the guide rail, moreover, as the thickness in width of the guide rail is thinner than in lengthwise of the guide rail, the buried plug when press fit into the counterbore of the bolt hole creates the load or stress trending to expand outwardly the counterbore in the guide rail, thereby somewhat bulging outwards the race surfaces on guide rail. In conventional machines, such slight deformation on the race surfaces has too little impact on the duration or traveling accuracy to cause trouble or questions. In the machine tools requiring severe operating conditions or machines demanding high traveling accuracy, it still remains a major challenge to develop a buried plug effective to restrain the deformation on the race surfaces of the guide rail.

Moreover, a buried plug envisaged using in the linear motion guide unit employed in the machines operating in severe environment has been developed. The buried plug is made of hard material such as iron, stainless steel, brass, ceramics or the like rich in duration, and hard to be damaged and worn. The buried plug has the grooves around the mating zone to make it possible to regulate fit in force in the bolt hole and make it easier to fit in the bolt hole. But, the buried plug in the linear motion guide unit constructed as stated earlier as having the interference extending uniformly around the full circumference of the counterbored hole, has the same issues as in the patent literature 1.

SUMMARY OF THE INVENTION

The present invention, therefore, has as its primary object to overcome the problem as described just above and to further improve the interference around the mating zone of the buried plug to create a load trending to expand the counterbore in the guide rail, (viz. action force to the guide rail), and a load trending to compress the buried plug to fix the buried plug in the counterbore (viz. reaction force to the buried plug). More particularly, the present invention provides a buried plug having a mating zone in which there are formed two flat areas equal or less in width than a diameter of the counterbore, the flat areas being disposed in the counterbore of the bolt hole to lie in opposition to each other in a widthwise direction of the guide rail, whereby an interference around the mating zone is made less or zero near a race surface, so that a load or force exerted on the guide rail is made less in a widthwise direction of the guide rail than in a lengthwise direction of the guide rail to lessen the force exerting on the race surface to protect the race surface from any deformation such as sidewise bulges. Protection against deformation of the race surface as stated earlier improves traveling accuracy in the relative movement of the slider in the linear motion guide unit, and further reduces variations in sliding resistance of the slider. Moreover, use of the locating jig for the buried plug makes it easier to take correct orientation of the buried plug relative to the counterbore without mistaking the direction of disposition of the buried plug, so that the dimension management of the diameter of the counterbore in the bolt hole may be freed from strict control.

The present invention is concerned with a linear motion guide unit comprising; a guide rail having lengthwise sides on which first raceway surfaces extend lengthwise of the guide rail and a lengthwise top surface having bolt holes used to fasten the guide rail to any other component, the bolt holes being provided with counterbores spaced apart from each other at a preselected interval, a slider that fits over or conforms to the guide rail for movement relative to the guide rail, the slider having second raceway surfaces lying in opposition to the first raceway surfaces of the guide rail to define load-carrying races between the first raceway surfaces and the second raceway surfaces, a plurality of rolling elements allowed to roll through the load-carrying races as the slider moves relative to the guide rail, and buried plugs which fit in the counterbores to close the counterbores;

wherein the buried plug has a mating zone having an outside circular portion to press fit into the counterbore of the bolt hole and a leading zone integral with an end of the mating zone to guide the buried plug into the counterbore of the bolt hole; and wherein the mating zone has an interference with the counterbore, the interference being lopsided over all the circumference of the counterbore, and further under a definition that a direction perpendicular to a lengthwise direction of the guide rail is referred to a widthwise direction of the guide rail, the interference exerting a force on the counterbore in the widthwise direction is determined less than the interference exerting the force on the counterbore in the lengthwise direction of the guide rail.

In accordance with the present invention, the mating zone is composed of a first mating portion in which an outside diametral dimension of the buried plug in the lengthwise direction of the guide rail is larger than a diametral dimension of the counterbore, and second mating portions in each of which an outside diametral dimension of the buried plug in the widthwise direction of the guide rail is equal or less than the diametral dimension of the counterbore. Moreover, the buried plug is formed of a substantially circular plate of a preselected thickness or height and the second mating portions are equally formed at diametral edges of the circular plate in diametrically symmetrical opposition to each other in the widthwise direction with respect to a center of the buried plug. Moreover, the second mating portion is composed of two flat surfaces making a substantially right angle to a top face of the buried plug, lying in opposition in the widthwise direction of the buried plug and extending in parallel with each other or inclined so as to make an interval between the flat surfaces narrower as the flat surfaces go from the top face of the buried plug towards the leading zone.

In accordance with the present invention, the following formulae are established in the mating zone of the buried plug; $W1<\phi D1$, $W1 \le \phi D3$, wherein $\phi D1$ is the diameter of the first mating portion is, $W1$ is a dimension extending between the two flat surfaces in the second mating portion, and $\phi D3$ is a diameter of the counterbore. Further, the diametrical dimension $W1$ between two flat surfaces of the second mating portion is equivalent to from 98.7% to 100% of the diameter $\phi D3$ of the counterbore and set a dimension equivalent to from 98.4% to 99% of the diametral dimension $\phi D1$ of the first mating portion.

In accordance with the present invention, the leading zone of the buried plug has an outside circular surface which is tapered at an inclination to become smaller in diameter as it goes ahead from the mating zone toward a leading edge of the leading zone. Moreover, the mating zone has a height or thickness of a half or more the overall height of the buried plug and the leading zone has a height or thickness less than a half the overall height of the plug. With the linear motion guide unit, in addition, the buried plug has an upper zone on a top side of the mating zone, the upper zone having an interference with the counterbore to exert a load or stress over a full circumference of the buried plug after the buried plug has press fit into the counterbore of the bolt hole.

With the linear motion guide unit of the present invention, the mating zone is composed of a first mating portion having an outside diameter larger than the diametral dimension of the counterbore and further having grooves extending circularly across a range corresponding to the lengthwise direction of the guide rail, a second mating portion having an outside diameter equal or less than the diametral dimension of the counterbore and being made in the flat surfaces extending circularly across a range corresponding to the widthwise direction of the guide rail, and a third mating portion lying nearer to the leading end than the first mating portion and partially cut away at a range corresponding to the flat surfaces.

With the linear motion guide unit of the present invention, the buried plug is formed in a substantially skirt-shaped hollow cylinder, on a leading edge of which there are provided recesses. Moreover, the mating zone is provided with a plurality of grooves of triangular, rectangular or round shape in cross-section to stow therein any burr which would be caused by the interference after the buried plug has been force fit into the counterbore. Moreover, the buried plug is made of a material selected from a soft metal including aluminum alloy and brass, soft steel, stainless steel and ceramics.

With the linear motion guide unit of the present invention, a locating jig tool determines mounting direction of the buried plug relative to the counterbore of the bolt hole in such a relation that the second mating portions of the buried plug are disposed opposed in widthwise direction of the guide rail. Moreover, the locating jig tool is shaped to stride from above across the top surface of the guide rail, the locating jig tool being composed of an upper member and flanges depending downward from sidewise opposite edges of the upper member to fit over the lengthwise sides of the guide rail, and the upper member is formed with an opening which admits the second mating portion. In addition, the guide rail has a directional mark at the counterbore or near the counterbore to indicate disposition of the buried plug and the buried plug has a discernment mark to indicate alignment or register with the directional mark, so that after the discernment mark of the buried plug has brought into alignment with the directional mark, the second mating portions on the buried plug is set opposed in the widthwise direction of the guide rail.

With the buried plug for the linear motion guide unit as constructed according to the present invention, the mating zone of the buried plug has the interference with the counterbore in the guide rail, the interference being made up of the first mating portion with grooves larger in diametral dimension than the counterbore and the second mating portion of the two flat surfaces opposed to each other in the widthwise direction of the guide rail across the diametral dimension equal or less than the diametral dimension of the counterbore. Thus, after the buried plug has press fit into the counterbore in such a relation that the second mating portions less in the interference are opposed to each other in the widthwise direction to lie along the race surfaces. As a result, the interference exerting a load or stress on the counterbore is made less in the widthwise direction of the guide rail or in the race surfaces than in the lengthwise direction of the guide rail, so that the force or stress in the lengthwise direction makes sure of the force sufficient to tighten the buried plug to the counterbore, whereas the force in the widthwise direction is set less to lessen the adverse impact such as the deformation or bulge which would be otherwise caused on the race surfaces of the guide rail by the interference. With the buried plug constructed according to the present invention, protection against deformation of the race surfaces as stated earlier improves traveling accuracy in relative movement of the slider in the linear motion guide unit, and further reduces variations in sliding resistance of the slider. Moreover, use of locating means such as the dedicated locating jig and discernment mark for the buried plug makes it easier to take correct orientation of the buried plug relative to the counterbore without mistaking the direction of disposition of the buried plug, so that the dimension management of the diameter of the counterbore in the bolt hole may be freed from strict control.

BRIEF DESCRIPTION OF THE DRAWINGS

In FIG. 4 (A) the buried plug is shown in a view of perspective and in FIG. 4 (B) the buried plug is shown in a view of side elevation.

In FIG. 5(A) the mating zone of the buried plug is shown in a view of top plan, in FIG. 5(B) the mating zone of the buried plug is shown in a view of transverse section taken on the plane of the line V-V of FIG. 4(B) and in FIG. 5(C) the mating zone of the buried plug is shown enlarged at a P area in FIG. 4(B).

In FIG. 6(A) the buried plug is shown in a view of side elevation, in FIG. 6(B) the buried plug is shown in a view of top plan and in FIG. 6(C) is a transverse section taken on the plane of the line VI-VI of FIG. 6(A).

In FIG. 7(A) the buried plug is shown in a view of side elevation, in FIG. 7(B) the buried plug is shown in a view of top plan and in FIG. 7(C) is a transverse section taken on the plane of the line VII-VII of FIG. 7(A).

In FIG. 8(A) the buried plug is shown in a view of side elevation, in FIG. 8(B) the buried plug is shown in a view of top plan and in FIG. 8(C) is a transverse section taken on the plane of the line VIII-VIII of FIG. 8(A).

In FIG. 9(A) the buried plug is shown in a view of side elevation, in FIG. 9(B) the buried plug is shown in a view of a transverse section taken on the plane of the line IX-IX of FIG. 9(A).

In FIG. 10(A) the locating jig is shown in a view of side elevation and in FIG. 10(B) the locating jig is shown in a view of top plan, In FIG. 11 (A) three sorts of circle and bar of the locating marks are shown in a view of top plan, in FIG. 11 (B) three sorts of arrowed locating marks are shown in a view of top plan and in FIG. 11(C) a linear locating mark extending in the lengthwise direction of the guide rail is shown in a view of top plan.

DETAILED DESCRIPTION OF THE PREFERRED EMBODIMENTS

The present invention is preferably befitted for a buried plug to close a bolt hole of a guide rail in a linear motion guide unit which is envisaged working in severe environments, where chips and dusts occurring in metal cutting process, for example in machine tools would fly and scatter over the guide rail exposed to the atmosphere.

Figure 1:
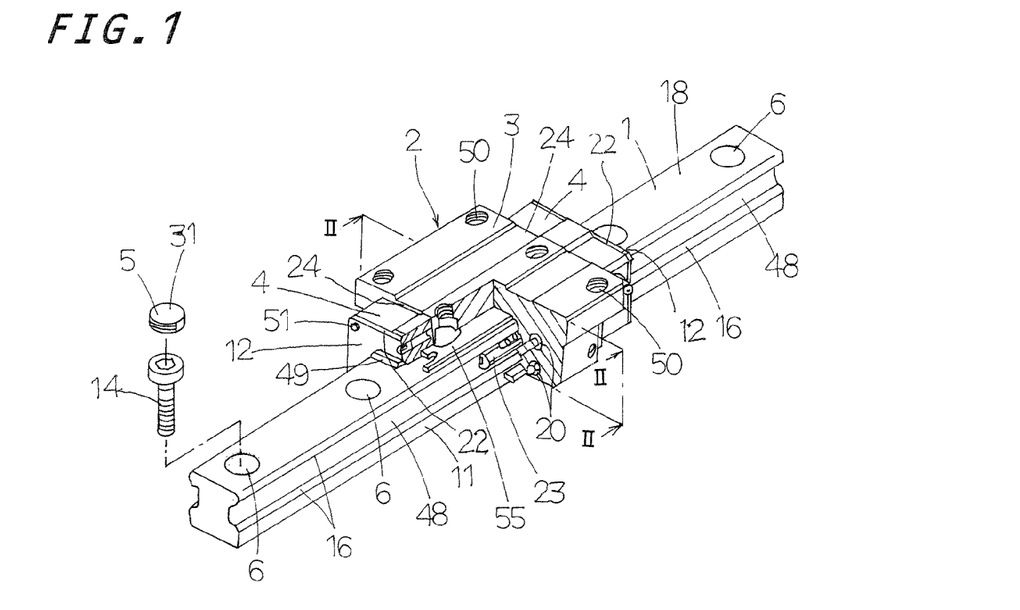
FIG. 1 is a view in perspective, partially broken away, showing a preferred embodiment of a linear motion guide unit equipped with a buried plug in a guide rail according to the present invention.
Figure 2:
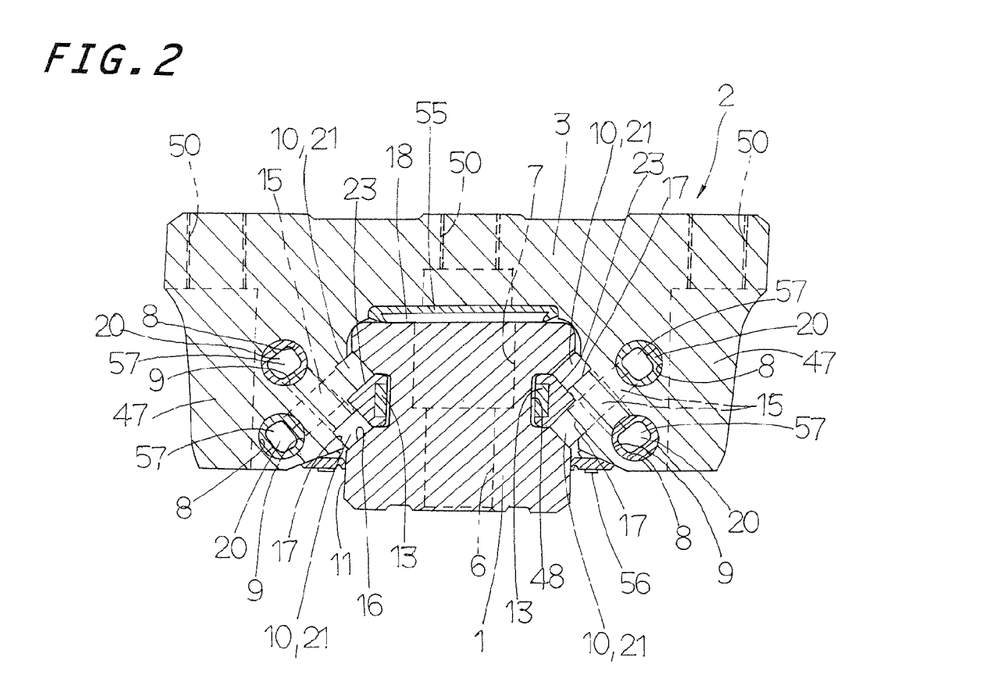
FIG. 2 is a view in a transverse section of the linear motion guide unit of FIG. 1, the view being taken on the plane of the line II-II of FIG. 1.
Figure 3:
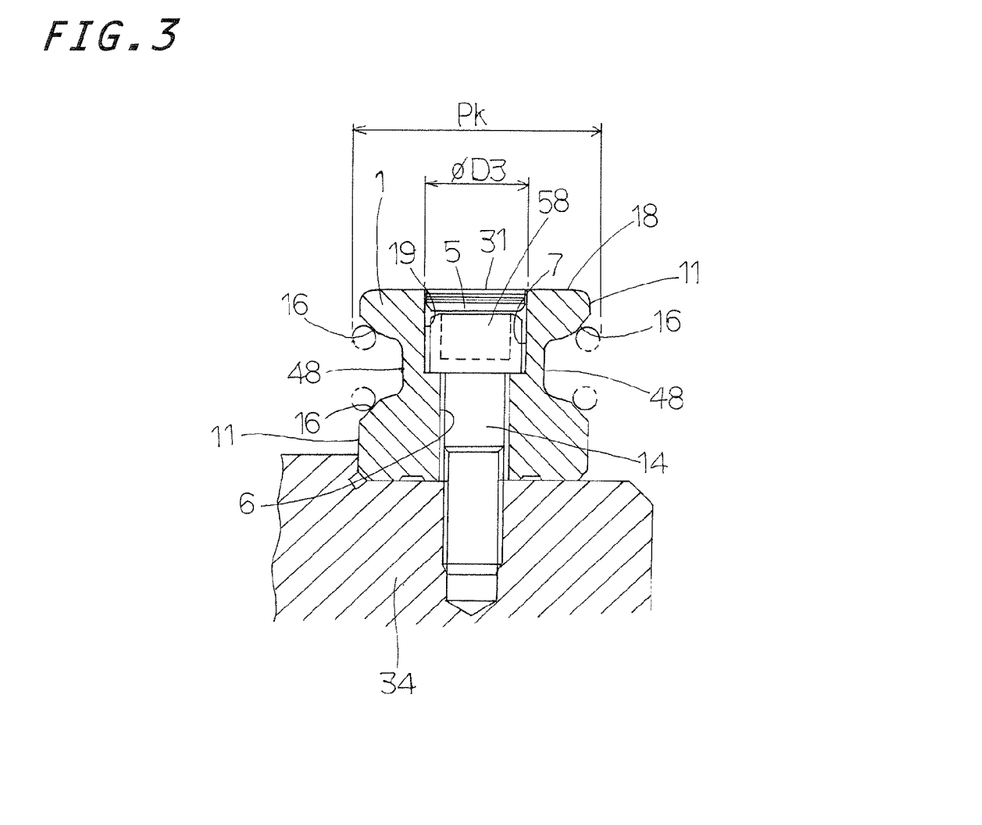
FIG. 3 is a view in section showing the linear motion guide unit of FIG. 1, in the view a buried plug has fit into a bolt hole in the guide rail which has been secured to a machine bed with a fastening bolt.

The guide rail with the buried plug of the present invention will be explained later with reference to FIGS. 1 to 11. The linear motion guide unit as shown in FIGS. 1, 2 and 3 is made in the cross-roller bearing system in which the rolling elements are rollers 10 rolling through four rows of races. This cross-roller bearing system is preferably befitted for the severe environments, in which high levels of foreign matter such as cut chips, dusts and the like are generated. The linear motion guide unit may be applicable to various sorts of a slider 2 without limitation on size and design. With a preferred embodiment of the linear motion guide unit, a guide rail is of a large size of 85 mm in widthwise dimension and the roller 10 is adopted as the rolling element. Moreover, the slider 2 is made as a flanged type in which there are formed threaded holes 50 used for fastening a counterpart, such as instruments, downwards. The linear motion guide unit can be actually used in a worse environment in which any person or worker would walk on a top surface 18 of the guide rail 1 so that a buried plug fit in a bolt hole 6 would be suffered to various external loads. To cope with this, it can be contrived to provide any counterbore, not shown, dedicated to the buried plug 5 to keep the buried plug 5 against collapsing into a counterbore 7 or getting out of the counterbore 7 even if the top surface 18 of the guide rail 1 would be subjected to any external load or stress. In the case as stated just earlier, the counterbore dedicated to the buried plug 5 could be made larger than the counterbore 7 for a cap head 58 of the fastening bolt 14 to make on the top surface 18 of the guide rail 1 an stepwise enlarged hole to fit over the buried plug 5, thereby bearing or supporting the buried plug 5 on the stepwise enlarged hole without collapsing.

The linear motion guide unit is in general comprised of the elongated guide rail 1 with a pair of raceway surfaces or first raceway surfaces 16 formed on lengthwise sides 11 thereof, and the slider 2 that fits over or conform to the guide rail 1 and has second raceway surfaces 17 lying in opposition to the first raceway surfaces 16 to define races 21. The slider 2 is movable relative to the guide rail 1 through the rolling elements of the rollers 10 rolling through circulating passages 15 made up of the races 21 defined between the first raceway surfaces 16 and the second raceway surfaces 17, and return passages 20 and turnaround passages 15 formed in the slider 2. With the linear motion guide unit of the present invention, the guide rail 1 has dimensions of, for example 85 mm in width and 67 mm in height. The bolt holes each have a diameter of $\phi 26.5$ mm and the adjacent bolt holes are spaced away from each other with an interval of 180 mm in lengthwise direction of the guide rail 1. The counterbore 7 of the bolt hole 6 has a diameter of $\phi 39$ mm and a depth of 30 mm. The fastening bolt 14 to be driven into the bolt hole 6 in the guide rail 1 has a hexagonal hollow head and size of M24. In FIG. 3, the guide rail 1 of FIG. 1 is shown mounted to a counterpart or machine bed 34 and the buried plug 5 is shown press fit into the bolt hole 6 of the guide rail 1. The races 16 formed the opposite sides 11 of the guide rail 1 are across a stride dimension Pk shown in FIG. 3. The slider 2 is composed of a carriage 3 having sidewise bulges 47, each of which has a pair of raceway surfaces 17 and a pair of return passages 20, end caps 4 lying in opposition to forward and aft end surfaces of the carriage 3 and having turnaround passages 15 to connect between the races 21 and the return passages 20, and end seals 12 placed on outward end surfaces 24 of the end caps 4. The rollers 10 roll through the races 21 while held in the races 21 with retainer plates 23 which are fastened to the end caps 4 by means of tightening straps 13, which are stowed in relief grooves 48 and fastened to the end caps 4 at their lengthwise opposite ends. The slider 2 has an inside seal 55 for dust-proof construction lying in opposition to the top surface 18 of the guide rail 1 and further a lower seal 56 extending along a bottom surface of the slider 2.

With the linear motion guide unit constructed as stated earlier, as shown in FIG. 2, while any number of rollers 10 roll through the race 21 defined between the raceway surface 16 and the raceway surface 17, the rollers 10 rolling through the upside race 21 circulate into the downside return passage 20 whereas the rollers 10 rolling through the downside race 21 circulate into the upside return passage 20, and in doing so the slider 2 is allowed to travel along the guide rail 1. With the dust-proof construction in the linear motion guide unit described here, the lower seals 56 are placed underneath the carriage 3 and end caps 4 and the end seals 12 are installed on the outward ends of the end caps 4, one to each end cap, in such a relation that lips 49 of the end seals 12 are in contact with, particularly, the top surface 18 of the guide rail 1. Moreover, the guide rail 1 has some bolt holes 6 which are used to fasten the guide rail 1 to various instruments, works, a mounting member, or a base 34 such as a machine bed. On the other hand, the carriage 3 has some threaded holes 50 which are used to mount thereon objects such as various instruments, works, a mounting member and so on. The end caps 4 and the end seals 12 are kept in place on the carriage 3 and tightened to the carriage 3 with fastening bolts 51, which are fastened to the carriage 3 after having been extended through holes in the end seals 12 and the end caps 4. The end caps 4 have lubrication ports or lubricating grooves, not shown, through which lubricant is fed to the circulating passages made up of the races 21, return passages 20 and turnaround passages 15. Tubular members 9 have through-holes 57 to define the return passages 20 and fit into lengthwise bores 8 in the carriage 3. The tubular members 9 are held at their lengthwise opposite ends to the end caps 4. Thus, the return passages 20 and the turnaround passages 15, despite a rectangular contour in transverse section, are connected smoothly with each other without causing any gap therebetween so that the rollers 10 can roll through the circulating circuits made up of the races 21, turnaround passages 15 and the return passages 20.

The buried plug 5 is preferably used press fit or forced into the counterbores 7 of the bolt holes 6 made in the exposed guide rail 1, particularly in the design specification, with no provision of dust-proof means such as telescopic covering and bellows on the guide rail 1. With the linear motion guide unit concerned with the present invention, particularly as shown in FIG. 3, some bolt holes 6 used to fasten the basement 34 and so on to the guide rail with fastening bolts 14 are made on the top surface 18 of the guide rail 1 spaced at preselected intervals apart from each other in the lengthwise direction of the guide rail 1, and the counterbores 7 of the bolt holes 6 are closed with the buried plugs 5, which are made of material selected from soft metal including aluminum alloy and brass, soft steel, stainless steel, ceramics. With the linear motion guide unit of the present invention, that is, the buried plug 5 is placed in the counterbore 7 of the bolt hole 6 on the guide rail 1 to close the counterbore 7. The buried plug 5 is mainly composed of a mating zone 25 having a peripheral portion which upon press fit or force fit makes engagement with an inside circular surface 19 of the counterbore 7 of the bolt hole 6, and a leading zone 26 integral with an end of the mating zone 25 to guide or introduce the buried plug 5 along the counterbore 7 of the bolt hole 6. In particular, the interference on the buried plug 5 against the counterbore 7 on the guide rail 1 is to create an action force trending to expand from the inside the inside circular surface 19 of the counterbore 7 and a reaction force trending to compress towards center the buried plug 5 to fix the buried plug 5 in the counterbore 7. With the buried plug 5 of the present invention, particularly the interference around the plug 5 is formed to become lopsided over all the circumference of the counterbore 7. On the definition that the direction perpendicular to the lengthwise direction of the guide rail 1 is referred to the direction opposed to the raceway surface or the widthwise direction of the guide rail, the present invention features that the interference exerting the force on the counterbore 7 in the widthwise direction is determined less than the interference exerting the force on the counterbore 7 in the lengthwise direction. With the linear motion guide unit of the present invention, namely, the load or force exerted on the guide rail 1 by the interference of the buried plug 5 force fit into the counterbore 7 is resolved divided into two components: a force component acting in the lengthwise direction and a force component acting in the widthwise direction. With the linear motion guide unit of the present invention, the force component in the widthwise direction is set less than the force component in the lengthwise direction and, in doing so, the force component in the lengthwise direction makes sure of the force sufficient to tighten the buried plug 5 to the counterbore 7 whereas the force component in the widthwise direction is set less to lessen the adverse impact such as the deformation which would be otherwise caused on the races 16 of the guide rail 1 by the interference.

Figure 4:
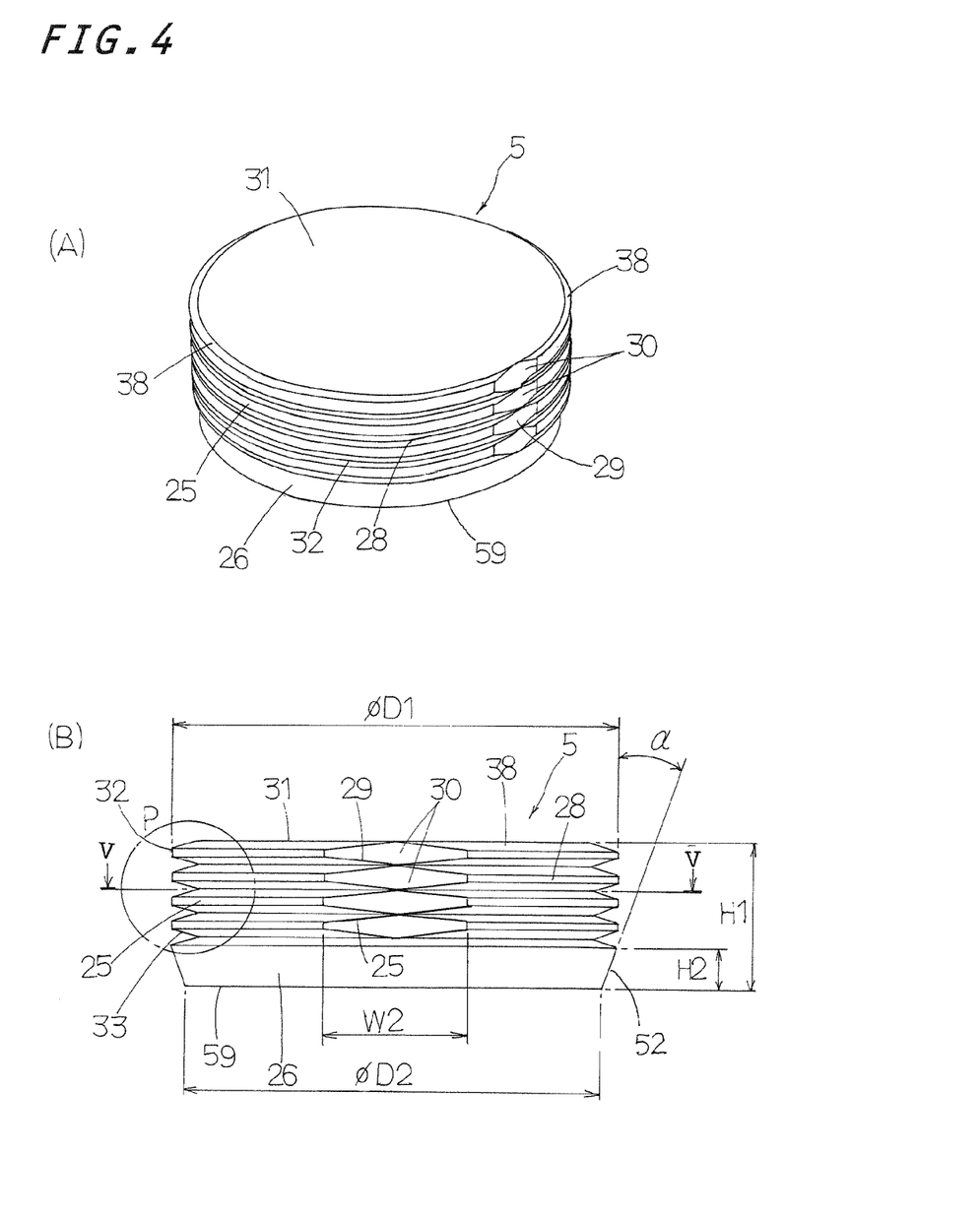
FIG. 4 is a view showing a preferred embodiment of the buried plug to be placed in the bolt hole of the guide rail.
Figure 5:
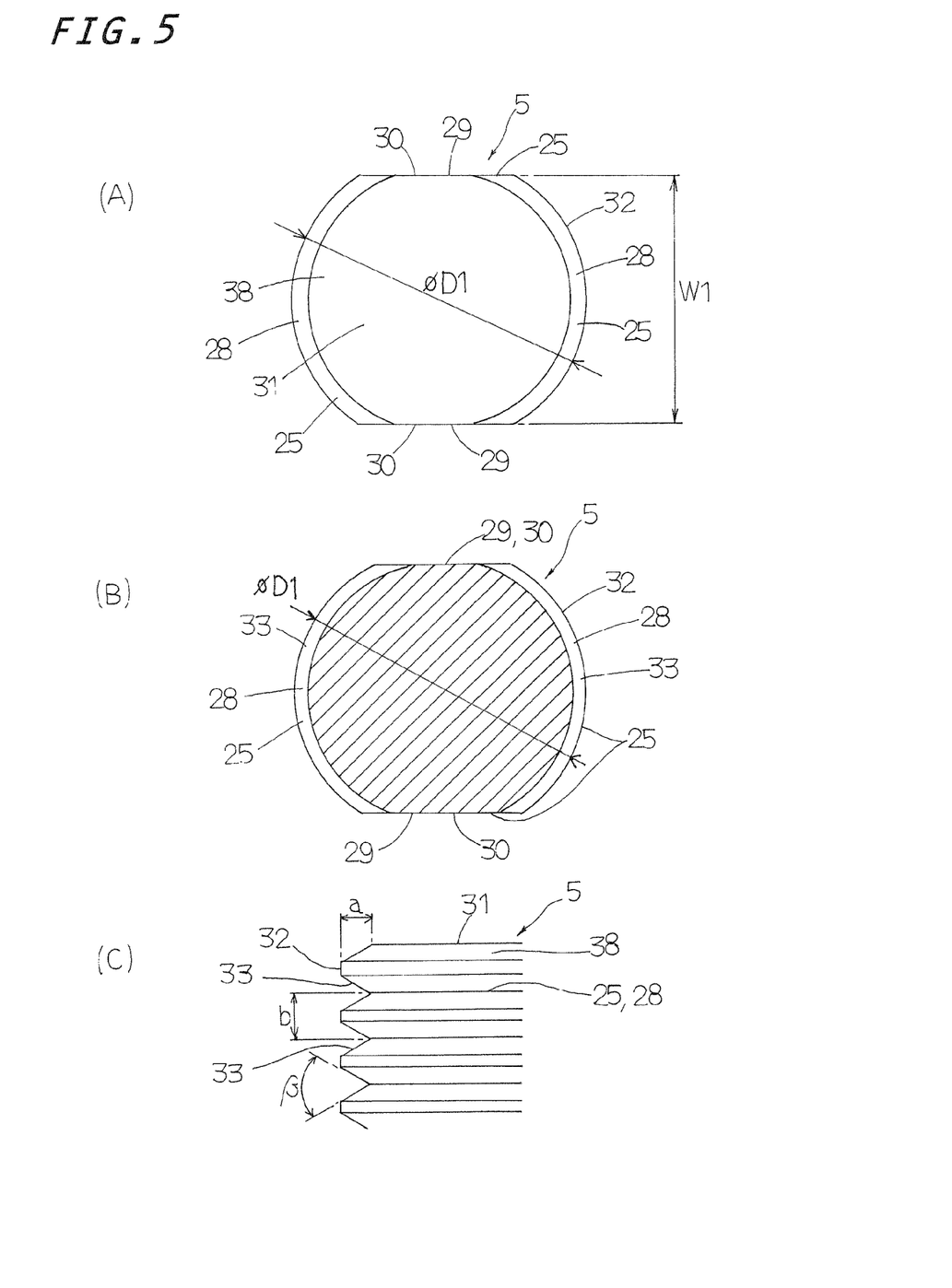
FIG. 5 is an enlarged view showing a mating zone of the buried plug of FIG. 4 (A).

The first embodiment of the buried plug 5 will be described in detail with reference to FIGS. 4 and 5. The buried plug 5 is made in a substantially solid circular cylinder having a desired thickness or height defined between an upper face 31 and a bottom face 59 lying in parallel with each other. The buried plug 5 is composed of an upper zone 38 on the side of the upper face 31, an intermediate mating zone 25 and a leading zone 26. The upper zone 38 is made in a flat contour to lie flush with the top surface 18 of the guide rail 1. The mating zone 25 has the interference to force fit into the inside circular surface 19 of the counterbore 7 of the bolt hole 6 and also is made up of a first mating portion 28 and a second mating portion 29. The first mating portion 28 has a plurality of grooves 33 extending circularly around the first mating portion 28. Each groove 33 is made for example wedged or triangular in cross-section, as shown in FIG. 4. The leading zone 26 has a guiding function to make it easier to keep the buried plug 5 in place inside the counterbore 7. To this end, the leading zone 26 is made tapered at an inclination a to become smaller in diameter as it goes ahead toward the bottom face 59. The leading zone 26 is formed smaller in diameter than the counterbore 7 to make it easier to tentatively insert the buried plug 5 in the counterbore 7. Around the mating zone 25, there are provided a plurality of grooves 33 of, for example, triangular, rectangular or round shape in cross-section, to stow therein any burr which would be caused by the interference after the buried plug 5 has been force fit into the counterbore 7. The grooves 33 further serve to moderate or alleviate the load or stress which would be exerted by the interference after the buried plug 5 has been force fit into the counterbore 7.

With the linear motion guide unit constructed as stated earlier, assuming that the diameter of the first mating portion 28 is $\phi D1$; the diameter of the leading zone 26 is $\phi D2$; the overall height of the buried plug 5 is H1; the height of the leading zone 26 is H2; a widthwise dimension between two flat surfaces 30 in the second mating portion 29 lying parallel with each other and opposite diametrically of the mating zone 25 is W1; a dimension extending across the flat surface 30 in the second mating portion 29 is W2; the tapered inclination of the leading zone 26 with respect to the first mating portion 28 is a. The buried plug 5 is made for example as follows.

The diametral dimension $\phi D1$ of the roughly cylindrical portion of the first mating portion was 39.4±0.03 mm.

The diametrical dimension W1 between two flat surfaces 30 of the second mating portion 29 was 38.8 mm-39 mm.

The dimension W2 extending across the flat surface 30 in the second mating portion 29 was, for example, about 5.6 mm.

The overall height H1 of the buried plug 5 is 6 mm and the height H2 of the leading zone was 2.55 mm. The tapered inclination a of the leading zone 26 is 20 degrees.

The diameter $\phi D2$ at the foremost end of the leading zone 26 was, for example, about $\phi 37.55$ mm.

The diameter $\phi D3$ of the counterbore 7 in the bolt hole 6 was $\phi 39$ mm~39.3 mm.

With the first mating portion 28, the diametral dimension $\phi D1$ of the outside circular surface 32 of the buried plug 5 was larger than the diameter $\phi D3$ of the counterbore 7, so that the buried plug 5 had the interference relative to the counterbore 7.

The diametrical dimension W1 between two flat surfaces 30 of the second mating portion 29 was made smaller than the diameter $\phi D3$ of the counterbore 7.

The diametrical dimension W1 between two flat surfaces 30 of the second mating portion 29 was made equivalent to from 98.7% to 100% of $\phi D3$, compared with the diameter $\phi D3$ of the counterbore 7, so that there was interference-free or no interference.

($W1/\phi D1$=38.8 mm/39.43 mm~39 mm/39.37 mm)

With the mating zone 25 of the buried plug 5 in the linear motion guide unit, more particularly, the relationships among the diameter $\phi D1$ of the first mating portion 28, the diametrical dimension W1 between two flat surfaces 30 of the second mating portion 29 and the diameter $\phi D3$ of the counterbore 7 were expressed as follows.

$W1<D1, W1 \le D3$

Moreover, the diametrical dimension W1 between two flat surfaces 30 of the second mating portion 29 in the buried plug 5 was made equivalent to from 98.7% to 100% of the diameter $\phi D3$ of the counterbore 7 and also equivalent to from 98.4% to 99% of the diametral dimension $\phi D1$ of the first mating portion 28.

On the definition that the direction perpendicular to the lengthwise direction of the guide rail 1 is referred to the widthwise direction of the guide rail 1, when the second mating portion 29 having the interference less than the first mating portion 28 or no interference is brought into line with the widthwise direction of the guide rail 1, the interference of the second mating portion 29 can be set less or zero, so that the races 16 of the guide aril 1 are prevented from the widthwise bulge which would occur otherwise when the buried plug 5 has been force fit into the counterbore 7. As a result, a variation on the preselected dimension or stride dimension Pk becomes less and no adverse impact occurs on the relative sliding movement of the slider 2. Let the depth of the groove 33 in the first mating portion 28 be sign a; the pitch dimension of the groove is sign b; and the open angle between the grooves 33 is R. Then, the depth a of the groove is made 0.2 mm, the pitch dimension b between adjacent roots of the grooves 33 is made 0.3 mm, and an open angle 13 between adjacent grooves 33 is made 60 degrees. The most interference of the first mating portion 28 is 0.215 mm when a diametral dimension of the counterbore 7 is the least while an outside dimension of the buried plug 5 is the most. The interference at a location the second mating portion 29 is opposed to the race 16 gradually lessens to reach zero at a location where a thickness of the guide rail across the counterbore 7 and the lengthwise side of the guide rail 1 is the smallest. When the interference of the first mating portion 28 is the least, the diametral dimension of the counterbore 7 is the most and the outside dimension of the plug 5 is the least of 0.035 mm. At the location where the second mating portion 29 is opposed to the race 16, there is a slight clearance in a range of 6.2 mm in the lengthwise direction of the guide rail 1. The clearance left between the counterbore 7 and the second mating portion 29 may serve as an inlet/outlet for air inside the bolt hole 6. The plug 5 is made of a metal which is richer in rigidity than plastics and selected from metallic material including soft metal such as aluminum alloy, brass and so on, soft steel, and stainless steel. The plug 5 befitted for the linear motion guide unit of the present invention, as made of metallic material, is difficult to collapse under the external load or stress acting on the plug 5 inward of the bolt hole 6, compared with the conventional plastic-made plug. Even if the plug 5 is caused to collapse in the counterbore 7 to create any recess on the upper face 31, foreign materials such as dust, chips and the like collected on the recess on the upper face 31 are hard to completely remove with the end seals 12 at the opposite ends of the slider 2, so that the foreign materials as stated earlier are highly liable to creep into the clearance between the slider 2 and the top surface 18 of the guide rail 1. With the embodiment shown here, the inside seal 55 is provided to keep the foreign materials against entering the clearance between the races 16 and 17, thereby protecting the rollers 10 from the possibility of biting the foreign materials between the rollers 10.

Figure 6:
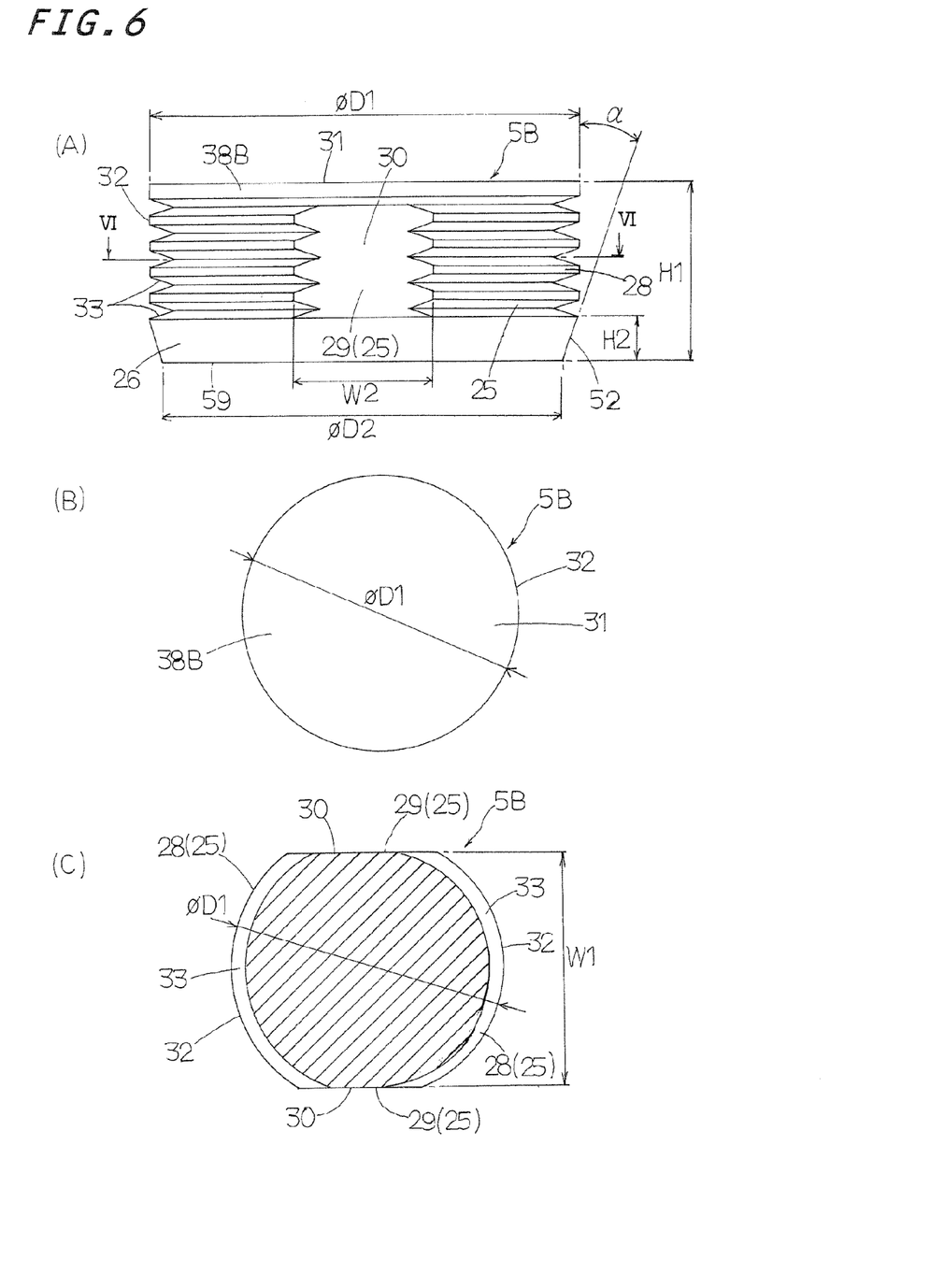
FIG. 6 is an enlarged view showing a second embodiment of the buried plug to be placed in the bolt hole of the guide rail.

Next, referring to FIG. 6, there is shown the second embodiment of the plug 5. In the second embodiment, common identification is employed for the parts or elements identical in function with the parts or elements identified in first embodiment. A plug 5B of the second embodiment is made in a substantially solid circular cylinder in which unlike the upper zone 38 in the first embodiment, an upper zone 38B has no flat surface 30, so that a recess is hard to appear around a circular edge of the counterbore 7 after the plug 5B has fit into the bolt hole 6 in the guide rail 1. The plug 5B of the second embodiment is similar in construction with the first embodiment other than the upper zone 38B has a completely circular contour. Moreover, after the plug 5B is force fit into the counterbore 7 of the bolt hole 6, the upper zone 38B lying flush with the top surface 18 of the guide rail 1 has a slight interference against the diameter of the counterbore 7 around the circumference of the buried plug 5B. The first mating portion 28 and the second mating portion 29 are identical in function with the first embodiment.

Figure 7:
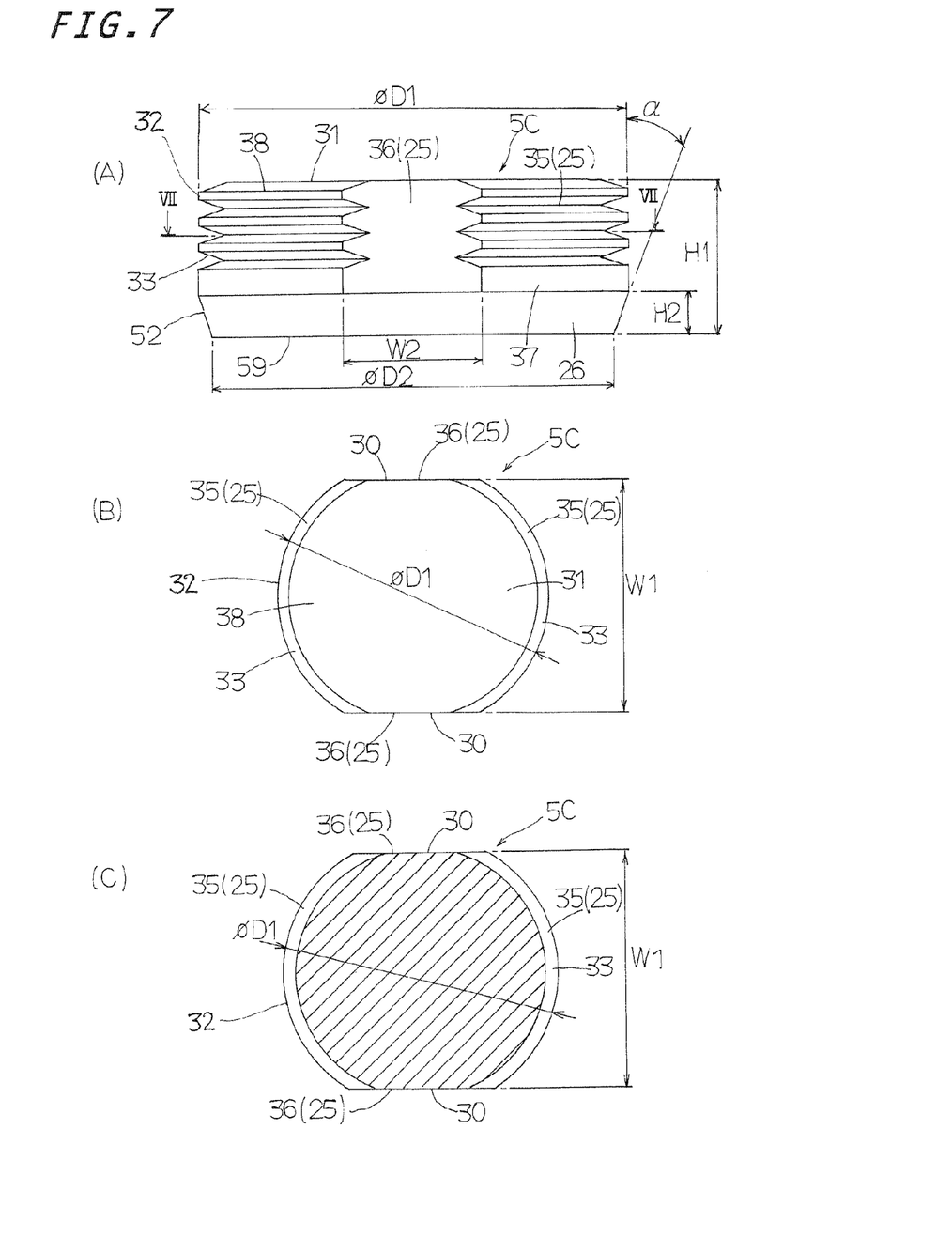
FIG. 7 is an enlarged view showing a third embodiment of the buried plug to be placed in the bolt hole of the guide rail.

Next, referring to FIG. 7, there is shown the third embodiment of the buried plug 5. In the third embodiment, common identification is employed for the parts or elements identical in function with the parts or elements identified in first embodiment. A plug 5C of the third embodiment has the mating zone 25 including a first mating portion 35 having the grooves, a second mating portion 36 having no groove and a third mating portion 37 lying between the first mating portion 35 and the leading zone 26 and having no groove. With the buried plug 5 of the third embodiment, the first mating portion 35 and the third mating portion 37 have the interference which is formed larger than in the second mating portion 36. In FIG. 7(A), the third mating portion 37 is shown provided underneath the first mating portion 35. As an alternative, the third mating portion 37, though not shown, may be provided on the side of the upper face 31 of the buried plug 5C. The third mating portion 37, because of no groove thereon, is hard to suffer the deformation and therefore the interference around there that can be exerted causes a strong or large load or stress. With the buried plug 5C in which the third mating portion 37 is formed above the upper face 31, the third mating portion 37 after the buried plug 5C has fit into the bolt hole 6 will be more spaced apart from the races 16, so that the plug 5C can be securely fastened while easing the adverse impact on the races 16 caused by the load or stress owing to the interference. More particularly, the mating zone 25 is composed of the first mating portion 35 having an outside diameter larger than the diametral dimension of the counterbore 7 and further having the grooves 33 extending circularly across a range corresponding to the lengthwise direction of the guide rail 1, the second mating portion 36 having the outside diameter equal or less than the diametral dimension of the counterbore 7 and being made in the flat surface 30 extending circularly across a range corresponding to the widthwise direction of the guide rail 1, and the third mating portion 37 lying nearer to the leading end than the first mating portion 35 and partially cut away at a range corresponding to the flat surface 30.

Figure 8:
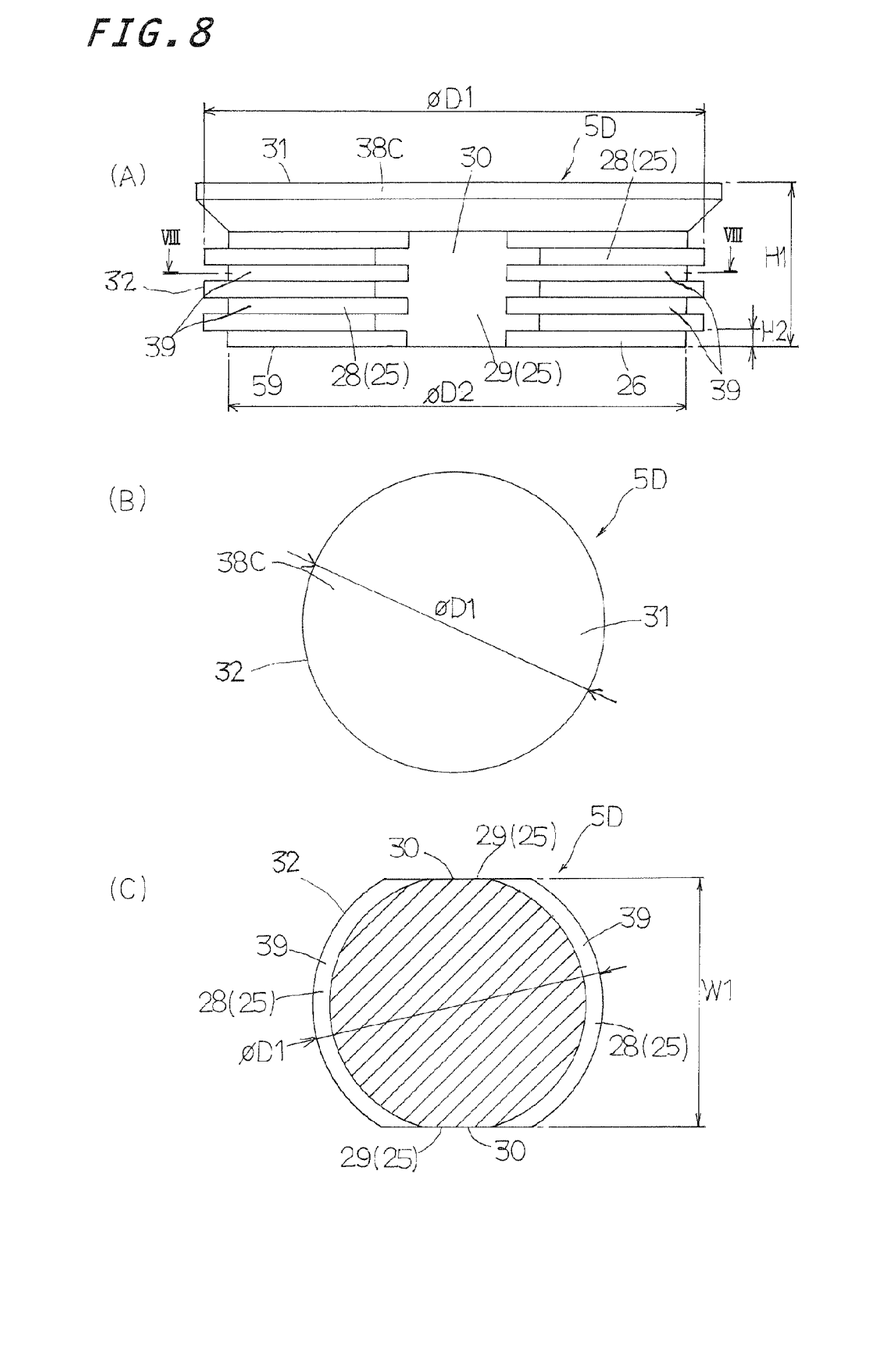
FIG. 8 is an enlarged view showing a fourth embodiment of the buried plug to be placed in the bolt hole of the guide rail.

Further, referring to FIG. 8, there is shown the fourth embodiment of the buried plug 5. In the fourth embodiment, common identification is employed for the parts or elements identical in function with the parts or elements identified in the first embodiment. With a plug 5D of the fourth embodiment, after it is press fit into the counterbore 7, a portion raised above the top surface 18 of the guide rail 1 is cut off by any tool to make a top surface 31 of the buried plug 5D flush with the top surface 18 of the guide rail 1. The buried plug 5D is made tapered at an upper portion 38C to closely fit into a bevel edge of the counterbore 7. With the buried plug 5D of the fourth embodiment, after the buried plug 5D has been force fit into the counterbore 7, a portion of the buried plug 5D raised above the top surface 18 of the guide rail 1 is cut out by any dedicated tool, not shown, to make a the upper face 31 of the buried plug 5D flush with the top surface 18 of the guide rail 1. As a result, the buried plug 5D doesn't disturb the close seal between the lips 49 of the end seals 12 and the top surface 18 of the guide rail 1, thereby helping ensure the dust-proof performance of the linear motion guide unit. With the embodiment shown here, the leading zone 26 lying underneath the first mating portion has a substantially cylindrical contour. The groove 39 in the first mating portion 28 has a rectangular shape in a transverse section so as to make the groove 39 larger in width. The groove 39 serves to release the load or stress caused by the interference between the buried plug 5D and the counterbore 7 after the buried plug 5D has been press fit into the counterbore 7. The shape in transverse section of the grooves 39 may be any of rounded shape and rectangular shape other than the triangular shape so long as the grooves can stow therein burrs which would occur in the press fit operation of the buried plug 5D into the counterbore 7. The grooves 39 may be formed with any knurling tool.

Figure 9:
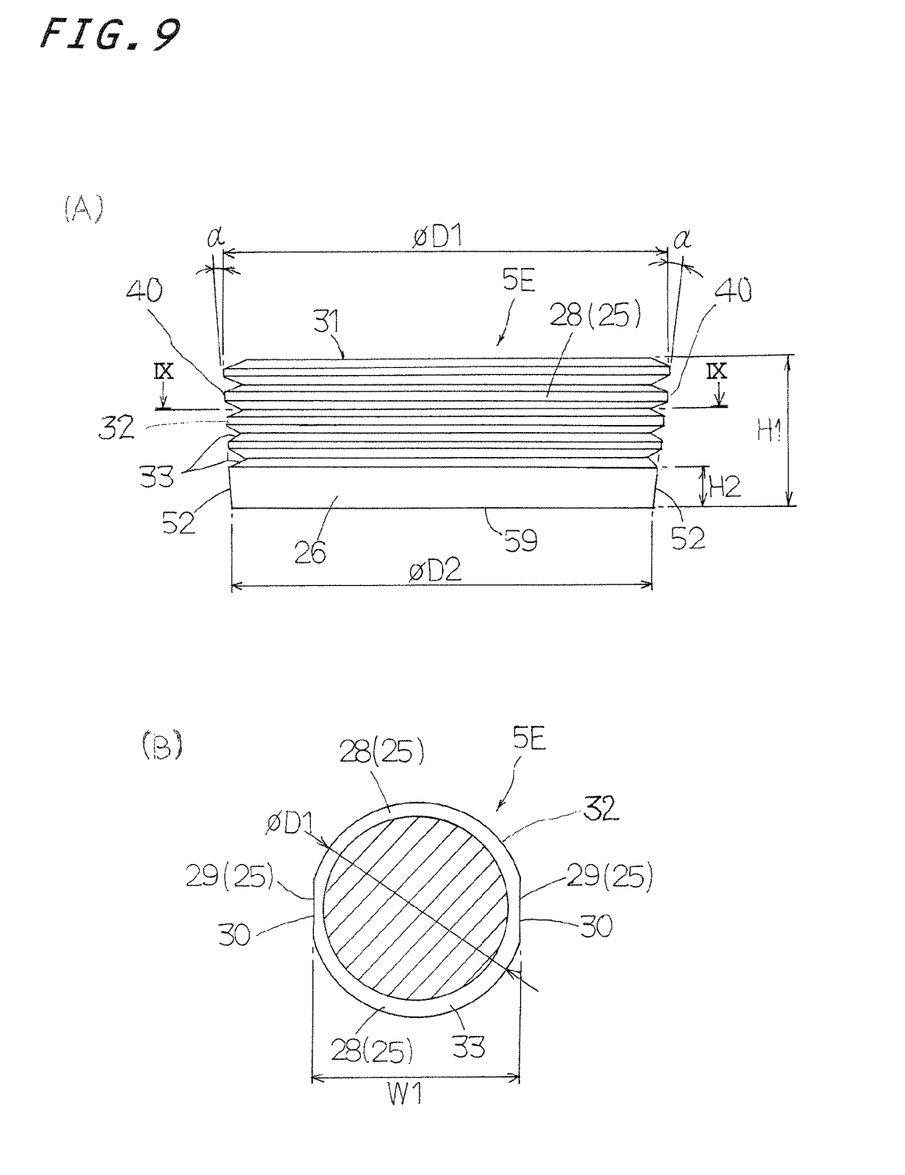
FIG. 9 is an enlarged view showing a fifth embodiment of the buried plug to be placed in the bolt hole of the guide rail.

Next, referring to FIG. 9, there is shown the fifth embodiment of the buried plug 5. In the fifth embodiment, common identification is employed for the parts or elements identical in function with the parts or elements identified in the first embodiment. A plug 5E of the fifth embodiment is constructed as with the first embodiment with the exception that the outside circular surfaces of the second mating portion 29 and the leading zone 26 in the first embodiment aren't made perpendicular to the upper face 31, but made in a slant surface inclined at an inclination a. As an alternative, the inclination a may be made different between the second mating portion 29 and the leading zone 26.

With the linear motion guide unit of the present invention, the construction or shape of the second mating portion 29 does not matter so long as the second mating portion 29 in the first embodiment is easy to suffer any deformation so as to ease the load or stress which would be exerted by the interference. With the grooves 33 on the mating zone 25 in which the second mating portion 29 is easier to suffer deformation, for instance, it is preferred that the grooves 33 in the second mating portion 29 are made deeper than in the first mating portion 28 while the grooves 33 are made larger in width and at the same ribs between adjacent grooves 33 are made less in width at their tops thereof. As an alternative, the second mating portion 29 may be made thinner than in the first mating portion 28 to make it easier subject them to deformation. As an alternative, moreover, different buried plugs 5 to 5E have the mating zone 25 of roughly skirt-shaped hollow cylinder smaller in thickness, on the back side of which there are provided recesses. With the linear motion guide unit of the present invention, namely, the leading zone of the different buried plugs 5 to 5E is recessed, not shown, to form skirt-shaped hollow cylinder. Although the buried plug of the present invention is described with application to the linear motion guide unit of a four-row roller type, it will be appreciated that the number of races 16 or the kind of rolling elements does not matter so long as the bolt holes 6 in the guide rail 1 have the counterbores 7 which will be closed with the buried plugs 5. The present invention also finds applications for the linear motion guide unit using balls as the rolling elements.

The mating zone 25 of the different buried plugs 5 to 5E is composed of the first mating portion 28, 35 in which the outside diameter of the different buried plugs 5 to 5E in the lengthwise direction of the guide rail 1 is larger than the diametral dimension of the counterbore 7 and the first mating portion 28, 35 in which the outside diameter of the different buried plugs 5 to 5E in the widthwise direction of the guide rail 1 is equal or less than the diametral dimension of the counterbore 7. Each of the different buried plugs 5 to 5E has a roughly circular plate of a preselected thickness. The first mating portions 28, 35 are formed on a circular edge of the roughly circular plate lying in diametrically symmetrical opposition to each other with respect to the center of the different buried plugs 5 to 5E. Moreover, the second mating portions 36 are composed of the flat surfaces 30 lying perpendicular at about right angles to the upper face 31 of the different buried plugs 5 to 5D. Further, the flat surfaces 30 as shown in FIGS. 5, 6, 7 and 8 are diametrically opposite to each other and in parallel with each other. As an alternative, the flat surfaces 30 in the buried plug 5E shown in FIG. 9 are designed to get close each other as they advance from the top face 31 towards leading zone 21 of the buried plug 5E.

The leading zone 26 of the different buried plugs 5 to 5C and 5E as shown in FIGS. 4, 6, 7 and 9 has an outside circular surface 52 which is made tapered to get smaller in diameter as the surface 52 goes from the mating portion 25 towards the leading edge. Moreover, the mating zone 25 of the different buried plugs 5 to 5C and 5E has the height or thickness of a half or more the overall height of the different buried plugs 5 to 5C and 5E and the leading zone 26 of the different buried plugs 5 to 5C and 5E has the height or thickness less than a half the overall height of the different buried plugs 5 to 5C and 5E.

Figure 10:
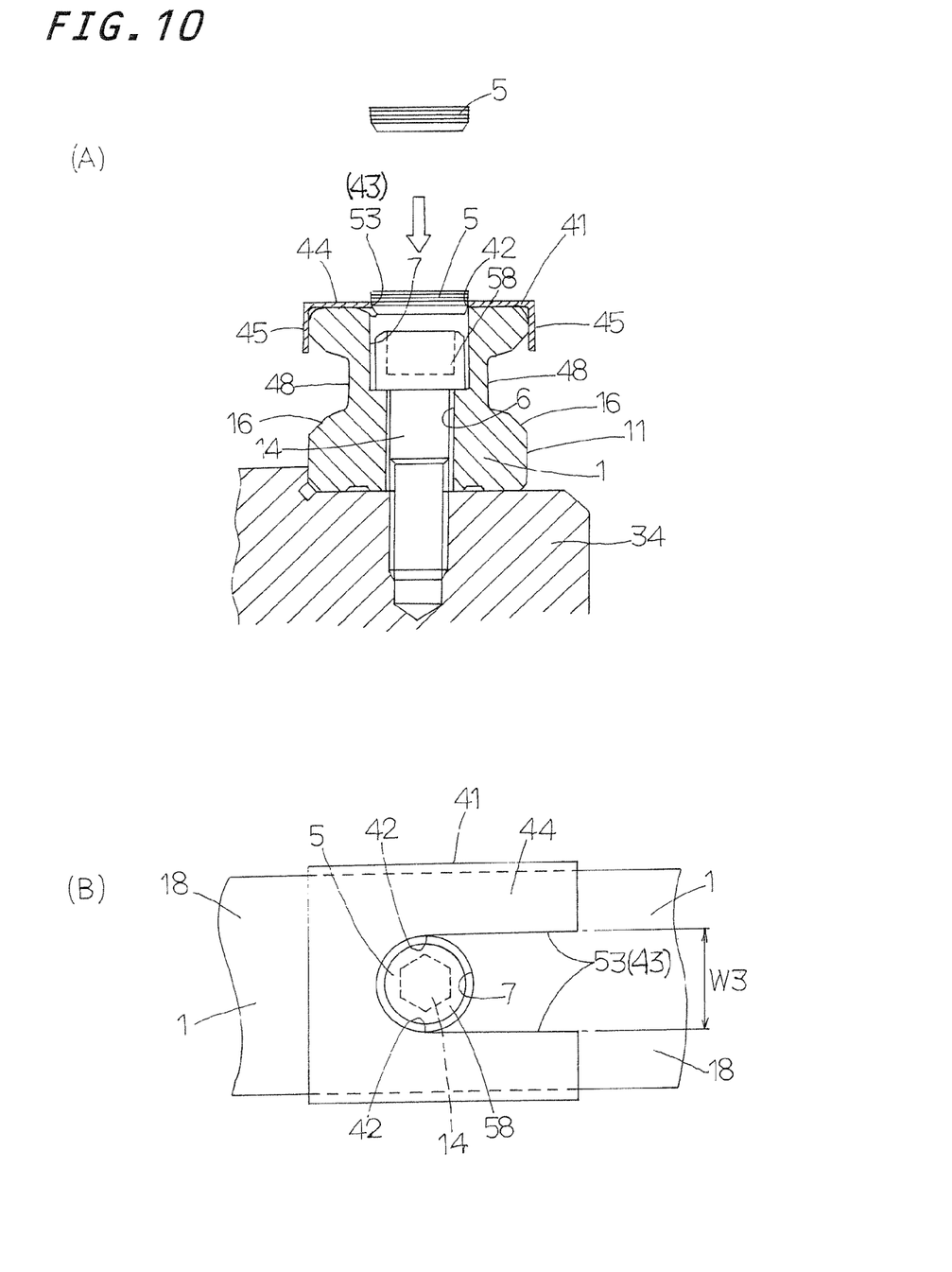
FIG. 10 is a view showing a locating jig to determine an angular position of the buried plug relative to the bolt hole in the guide rail of the linear motion guide unit.

Referring to FIG. 10, it will be described later how a locating jig tool 41 is used to locate the different buried plugs 5 to 5E (referred to a generic name "buried plug 6" hereinafter) with respect to the counterbore 7 of the bolt hole 6 in the guide rail 1. More particularly, the locating jig tool 41 is used to determine mounting direction of the buried plug 5 relative to the counterbore 7 of the bolt hole 6 in such a relation that the second mating portions 29 of the buried plug 5 are disposed opposed in widthwise direction of the guide rail 1. The locating jig tool 41 is shaped to stride across the top surface 18 of the guide rail 1 and formed with an opening 53 which admits the second mating portion 29 into there. The opening 53 in the locating jig tool 41 is provided to make it easier to determine the mounting direction of the buried plug 5. The locating jig tool 41 has an upper member 44 and flanges 45 depending downward from sidewise opposite edges of the upper member 44 to fit over the lengthwise sides 11 of the guide rail 1. The opening 53 is made by partially cutting into the upper member 44 from an edge of the upper member 44. The opening 53 includes a locating part 42 to fit over the buried plug 5 and locating surfaces 43 to make sliding contact with the second mating portions 29 of the buried plug 5. More particularly, an interval dimension W3 between the locating surfaces 43 lying in opposition to each other is set slightly more than the widthwise dimension between the opposite second mating portions 29 or the flat surfaces 30, but less than the diameter φD1 of the first mating portion 28 of the buried plug 5. Moreover, the flanges 45 of the jig tool 41 fit over to catch widthwise shoulders of the guide rail 1.

Figure 11:
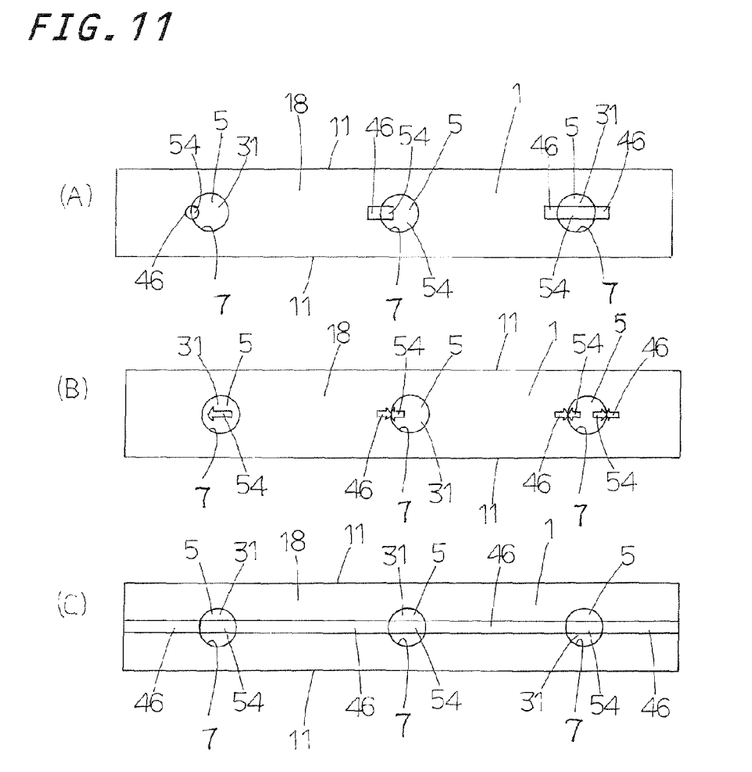
FIG. 11 is a view showing examples of a locating mark to determine the angular position of the buried plug relative to the bolt hole in the guide rail of the linear motion guide unit.

How to locate the buried plug 5 by using the jig tool 41 will be, for instance as follows. An aperture in the locating part 42 at the end of the opening 53 of the jig tool 41 is first placed in alignment with the counterbore 7 in the guide rail 1. Mounting direction of the buried plug 5 is adjusted to admit the buried plug 5 passing between the locating surfaces 43 lying in opposition to each other. The buried plug 5 is adjusted in the mounting direction in which the flat surfaces 30 of the second mating portion 29 lie in opposition widthwise of the guide rail 1. Then the buried plug 5 after being set in the correct mounting direction relative to the counterbore 7 in the guide rail 1 is patted down into the bolt hole 6 and tentatively held in the counterbore 7. The buried plug 5 tentatively held in the counterbore 7 is forced or driven into the counterbore 7 by any press-fit tools, preferably a hammer. More particularly, steps to press fit the buried plug 5 into the counterbore 7 by using the hammer are, for instance, as follows. The buried plug 5 is adjusted in mounting direction by using the locating jig tool 41 in such a relation that the second mating portions 29 of the buried plug 5 come in alignment with the counterbore 7 in the guide rail 1 in widthwise direction of the guide rail 1. Thereafter, the buried plug 5 is patted down into the bolt hole 6 and tentatively held in the bolt hole 6. The buried plug 5 is kept so as not to lean relative to the axial direction of the bolt hole 6 by using, for instance, a backing plate. Then, the buried plug 5 is driven into the counterbore 7 of the bolt hole 6 by hammering the backing plate. The buried plug 5 is driven down until the upper face 31 of the buried plug 5 becomes flush with the top surface 18 of the guide rail 1. The buried plugs 5 are driven one after another into the counterbores 7 of the bolt holes 6 according to the procedures as stated earlier, Alternatives to locate the buried plug 5 to the counterbore 7 of the bolt hole 6 will be described later with reference to FIG. 11. In FIG. 11(A) there are illustrated three sorts of marks. In FIG. 11(B) there are shown other three sorts of marks and FIG. 11(C) shows further other sort of mark. With these alternatives, the process for locating the mounting direction of the buried plug 5 relative to the counterbore 7 of the bolt hole 6 in the guide rail 1 is carried out visually. The buried plug 5 has a discernment mark to be aligned with directional sign 46 affixed to the counterbore 7 of the guide rail 1 or near the counterbore 7 to indicate the mounting direction of the buried plug 5. After alignment of the discernment mark 54 on the buried plug 5 with the directional sign 46 on the guide rail 1, the second mating portions 29 of the buried plug 5 are disposed opposed widthwise of the guide rail 1 across the counterbore 7 on the guide rail 1. The directional sign 46 affixed to the guide rail 1 is the discernment mark to indicate the mounting direction of the top face 31 on the upper surface 18 of the guide rail 1 after the buried plug 5 has fit into the counterbore 7. For instance, the visual discernment mark is the buried plug mark which extends striding over both the circular edge of the bolt hole 6 on the top surface 18 of the guide rail 1 and the upper face 31 of the buried plug 5. In FIG. 11(A), there are shown a circle mark indicated partly on a circular edge of the buried plug 5 at left of figure, or a rectangle at middle of figure, or a rectangle extending across the overall length diameter of the buried plug 5 at right of figure. In FIG. 11(B), there are shown an arrowed mark on the upper face 31 of the buried plug 5 to indicate the lengthwise direction at right, or oppositely arrowed marks, one lying on the top face 18 of the guide rail 1, another lying on the top face 31 of the buried plug 5 at middle of figure, or the oppositely arrowed marks lying across the diameter of the buried plug 5 at right of figure. In FIG. 11(C), there is shown a linear directional sign extending across the overall length of the guide rail 1. As recited above, the simple mark or sign such as circle and arrow discriminated at a glance is sufficient for the directional sign 46 on the guide rail 1 and the discernment mark 54 on the buried plug 5, The discernment marks or signs are made by painting, erosion, laser marking and so on.

What is claimed is:

1. A linear motion guide unit comprising;
a guide rail having lengthwise sides on which first raceway surfaces extend lengthwise of the guide rail and a lengthwise top surface having bolt holes used to fasten the guide rail to any other component, the bolt holes being provided with counterbores spaced apart from each other at a preselected interval,
a slider that fits over or conforms to the guide rail for movement relative to the guide rail, the slider having second raceway surfaces lying in opposition to the first raceway surfaces of the guide rail to define load-carrying races between the first raceway surfaces and the second raceway surfaces,
a plurality of rolling elements allowed to roll through the load-carrying races as the slider moves relative to the guide rail, and buried plugs which fit in the counterbores to close the counterbores;
wherein the buried plug has a mating zone having an outside circular portion to press fit into the counterbore of the bolt hole and a leading zone integral with an end of the mating zone to guide the buried plug into the counterbore of the bolt hole; and
wherein the mating zone has an interference with the counterbore, the interference being lopsided over all the circumference of the counterbore, and further under a definition that a direction perpendicular to a lengthwise direction of the guide rail is referred to a widthwise direction of the guide rail, the interference exerting a force on the counterbore in the widthwise direction is determined less than the interference exerting the force on the counterbore in the lengthwise direction of the guide rail.

2. A linear motion guide unit constructed as defined in claim 1 wherein the mating zone is composed of a first mating portion in which an outside diametral dimension of the buried plug in the lengthwise direction of the guide rail is larger than a diametral dimension of the counterbore, and second mating portions in each of which an outside diametral dimension of the buried plug in the widthwise direction of the guide rail is equal or less than the diametral dimension of the counterbore.

3. A linear motion guide unit constructed as defined in claim 2 wherein the buried plug is formed of a substantially circular plate of a preselected thickness or height and the second mating portions are equally formed at diametral edges of the circular plate in diametrically symmetrical opposition to each other in the widthwise direction with respect to a center of the buried plug.

4. A linear motion guide unit constructed as defined in claim 2 wherein the second mating portion is composed of two flat surfaces making a substantially right angle to a top face of the buried plug, lying in opposition in the widthwise direction of the buried plug and extending in parallel with each other or inclined so as to make an interval between the flat surfaces narrower as the flat surfaces go from the top face of the buried plug towards the leading zone.

5. A linear motion guide unit constructed as defined in claim 4 wherein the following formulae are established in the mating zone of the buried plug; $W1<\phi D1$, $W1 \leq \phi D3$, wherein $\phi D1$ is the diameter of the first mating portion, W1 is a dimension extending between the two flat surfaces in the second mating portion, and $\phi D3$ is a diameter of the counter bore.

6. A linear motion guide unit constructed as defined in claim 4 wherein the diametrical dimension W1 between two flat surfaces of the second mating portion is equivalent to from 98.7% to 100% of the diameter $\phi D3$ of the counterbore and set a dimension equivalent to from 98.4% to 99% of the diametral dimension $\phi D1$ of the first mating portion.

7. A linear motion guide unit constructed as defined in claim 2 wherein a locating jig tool determines mounting direction of the buried plug relative to the counterbore of the bolt hole in such a relation that the second mating portions of the buried plug are disposed opposed in widthwise direction of the guide rail.

8. A linear motion guide unit constructed as defined in claim 7 wherein the locating jig tool is shaped to stride from above across the top surface of the guide rail, the locating jig tool being composed of an upper member and flanges depending downward from sidewise opposite edges of the upper member to fit over the lengthwise sides of the guide rail, and the upper member is formed with an opening which admits the second mating portion.

9. A linear motion guide unit constructed as defined in claim 2 wherein the guide rail has a directional mark at the counterbore or near the counterbore to indicate disposition of the buried plug and the buried plug has a discernment mark to indicate alignment or register with the directional mark, so that after the discernment mark of the buried plug has brought into alignment with the directional mark, the second mating portions on the buried plug is set opposed in the widthwise direction of the guide rail.

10. A linear motion guide unit constructed as defined in claim 1 wherein the leading zone of the buried plug has an outside circular surface which is tapered at an inclination to become less in diameter as it goes ahead from the mating zone toward a leading edge of the leading zone.

11. A linear motion guide unit constructed as defined in claim 1 wherein the mating zone has a height or thickness of a half or more an overall height of the buried plug and the leading zone has a height or thickness less than a half the overall height of the plug.

12. A linear motion guide unit constructed as defined in claim 1 wherein the buried plug has an upper zone on a top side of the mating zone, the upper zone having an interference with the counter bore to exert a load or stress over a full circumference of the buried plug after the buried plug has press fit into the counterbore of the bolt hole.

13. A linear motion guide unit constructed as defined in claim 1 wherein the mating zone is composed of a first mating portion having an outside diameter larger than the diametral dimension of the counterbore and further having grooves extending circularly across a range corresponding to the lengthwise direction of the guide rail, a second mating portion having an outside diameter equal or less than the diametral dimension of the counterbore and being made in the flat surfaces extending circularly across a range corresponding to the widthwise direction of the guide rail, and a third mating portion lying nearer to the leading end than the first mating portion and partially cut away at a range corresponding to the flat surfaces.

14. A linear motion guide unit constructed as defined in claim 1 wherein the buried plug is formed in a substantially skirt-shaped hollow cylinder, on a leading edge of which there are provided recesses.

15. A linear motion guide unit constructed as defined in claim 1 wherein the mating zone is provided with a plurality of grooves of triangular, rectangular or round shape in cross-section to stow therein any burr which would be caused by the interference after the buried plug has been force fit into the counterbore.

16. A linear motion guide unit constructed as defined in claim 1 wherein the buried plug is made of a material selected from a soft metal including aluminum alloy and brass, soft steel, stainless steel and ceramics.

\* \* \* \* \*